United States Patent
Fluhr et al.

(10) Patent No.: US 8,489,384 B2
(45) Date of Patent: Jul. 16, 2013

(54) AUTOMATIC TRANSLATION METHOD

(75) Inventors: Christian Fluhr, Etampes (FR);
Gregory Grefenstette, Paris (FR);
Nasredine Semmar, Villiers le Bâcle (FR)

(73) Assignee: Commissariat a l'Energie Atomique, Paris (FR)

(*) Notice: Subject to any disclaimer, the term of this patent is extended or adjusted under 35 U.S.C. 154(b) by 881 days.

(21) Appl. No.: 12/532,280

(22) PCT Filed: Mar. 12, 2008

(86) PCT No.: PCT/EP2008/052964
§ 371 (c)(1),
(2), (4) Date: Dec. 16, 2009

(87) PCT Pub. No.: WO2008/113733
PCT Pub. Date: Sep. 25, 2008

(65) Prior Publication Data
US 2010/0114558 A1 May 6, 2010

(30) Foreign Application Priority Data

Mar. 20, 2007 (FR) .................................. 07 02007

(51) Int. Cl.
*G06F 17/28* (2006.01)

(52) U.S. Cl.
USPC .......................................................... 704/2

(58) Field of Classification Search
USPC ...................................................... 704/1–10
See application file for complete search history.

(56) References Cited

U.S. PATENT DOCUMENTS 7,146,358 B1 12/2006 Gravano et al.

OTHER PUBLICATIONS

Semmar, N. and Fluhr, C., "Using Cross-language Information Retrievel for Sentence Alignment," The Challenge of Arabic for NLP/MT. International Conference at the British Computer Society, 1995, 23 pages, XP002455816, London, UK, extracted from the Internet at URL:http://www.mt-archive.info/BC-2006-Semmar.pdf on Oct. 19, 2007.

Komatsu, E. et al., "A Mono-lingual Corpus-Based Machine Translation of the Interlingua Method," TMI-93. The Fifth International Conference on Theoretical and Methodological Issues in Machine Translation, Jul. 14, 1993-Jul. 16, 1993, pp. 24-46, XP002455817, Kyoto, Japan, extracted from the Internet at URL:http://www.mt-archive.info/TMI-1993-Komatsu.pdf on Oct. 19, 2007.

Grefenstette, G., "The World Wide Web as a Resource for Example-Based Machine Translation Tasks," Translating and the Computer 21. Proceedings of the International Conference on Translating and the Computer, Translating and the Computer. Proceedings of the ABLIB Conference, Nov. 10, 1999, pp. 1-12, XP002275655.

International Search Report, mailed May 9, 2008, in parent International Application No. PCT/EP2008/052964, filed Mar. 12, 2008.

*Primary Examiner* — Abul Azad
(74) *Attorney, Agent, or Firm* — Baker & Hostetler LLP

(57) ABSTRACT

The present invention relates to an automatic translation method.

When a sentence in a source language is translated into a sentence in a target language, the method comprises:
a step (1) of extracting the set of sentence portions of the target language from a textual database that correspond to a total or partial translation of the source sentence to be translated;
a step (2) of determining all the assemblies of these target sentence portions that overlap the source sentence;
a step (3) of choosing the best assemblies according to a criterion of maximum overlap between the target sentence portions assembled in the preceding step and according to a criterion of minimizing the number of assembled elements;
a step (4) of determining the target sentence by choosing the best assembly according to coherence criteria.

The invention is notably applicable to the translation of texts in a rare language.

More generally, it applies to translation with no previously established bilingual texts.

9 Claims, 4 Drawing Sheets

AUTOMATIC TRANSLATION METHOD

CROSS-REFERENCE TO RELATED APPLICATIONS

This application is a national stage of International Application No. PCT/EP2008/052964, filed Mar. 12, 2008, which claims priority to foreign French Application No. FR 07 02007, filed Mar. 20, 2007, the disclosure of each application is hereby incorporated by reference in their entirety.

FIELD OF THE INVENTION

The present invention relates to an automatic translation method. Generally, it applies to translations even with no previously established bilingual texts. It applies notably to the translation of texts involving a rare language.

BACKGROUND OF THE INVENTION

Automatic translation systems can currently be split according to at least two modes.

In a first mode, the translation systems are based on a morphosyntactic analysis of the sentences to be translated and then on a transfer and the generation of the translated sentences. The only semantics used relate generally to the usage restrictions incorporated in the bilingual dictionaries stored in databases. To obtain an understandable translation in a field, it is best to spend time adding the specialist vocabulary and adding the restrictions of meaning to the dictionaries. The quality of the translations provides a certain overall degree of comprehensibility of the texts but does not constitute a translation that can be used without extensive editing. Furthermore, these systems take little account of the language usages that make one sentence acceptable whereas another, although correct syntactically and semantically, is not acceptable.

In a second mode, the systems make use of translation memories which use, for the translation, the resemblance of the sentences to be translated with an already translated sentence. For this, it is necessary to have numerous translated texts and align the sentences, translations of one another, using an alignment algorithm. Monolingual information search techniques, in the source language, are then used to search for the sentence that is closest to a sentence to be translated in the same language. The translation is provided through the preliminary alignment of the sentences of the texts already translated. These systems are notably used to translate technical documents for products given that, from one version to another, the texts do not vary very much.

Moreover, on the basis of technologies used for speech recognition, an automatic translation approach has been developed that is inspired by translation memories. This involves using statistical methods relating to successions of a number n of words, normally three, to exploit the translated texts and calculate the probability of their translations being found in the other element of the bilingual text. These techniques have proved better than the conventional automatic translation systems. However, while in the field of news for example, there are enough corpora, including bilingual, in particular between English and the languages that are economically the most important, in all the other fields these techniques do not have sufficient data to be operational. Furthermore, they do not exploit all of the knowledge that is contained in the rare bilingual texts that exist through the use of N grams or successions of N words taken into account to create language models. The succession of 2, 3 or N words then has to be identical to what is to be translated, which is generally too restrictive. In practice, the strict succession constraint is highly restrictive. For example, translating "il mange souvent du chocolat" from French to English as "he often eats chocolate" does not make it possible to translate "il mange du chocolat". Similarly, the words must be strictly identical. Thus, "Le gâteau est bon" which is translated as "The cake is good" does not make it possible to translate "Les gâteaux sont bons". This is notably due to the fact that there is generally no linguistic processing in such systems because they are purely statistical systems.

Moreover, another major drawback stems notably from the large volume of data used to learn the translation. In practice, the quantity of available bilingual texts is infinitely smaller than the texts available in the target language alone, that is to say, in the language to be translated. This is all the more significant if the aim is, for example, to translate from a rare language to a common language, notably like French or English, cases where the bilingual texts are rare or even nonexistent on computer media.

SUMMARY OF THE INVENTION

One aim of the invention is notably to overcome the above-mentioned drawbacks. To this end, the subject of the invention is a method of automatically translating a sentence in a source language, called source sentence, into a sentence in a target language, called target sentence, the method comprising:
  a step of extracting the set of sentence portions of the target language from a textual database that correspond to a total or partial translation of the source sentence to be translated;
  a step of determining all the assemblies of these target sentence portions that overlap the source sentence;
  a step of choosing the best assemblies according to a criterion of maximum overlap between the target sentence portions assembled in the preceding step and according to a criterion of minimizing the number of assembled elements;
  a step of determining the target sentence by choosing the best assembly according to coherence criteria.

The method includes, for example, a preliminary step of creating the textual database of the target language from which the sentence portions are extracted.

In a particular embodiment, the database can be created according to the following phases:
  a first phase for recovering the texts in the target language;
  a second phase for breaking down the recovered texts into sentences and performing a syntactic analysis;
  a third phase for gathering together the texts of the sentences accompanied by a representation of their syntactic analysis.

In the step of creating the database in the target language, the syntactic analysis is, for example, carried out in the form of dependency relationships, the result of the analysis being coded by triplets (governor, dependent, relationship) associated with an indication of location in the various sentences of the database in which they appear, the governor being a main word and its dependent being a word that qualifies it according to the relationship.

The first step of the method comprises, for example:
  a source sentence syntactic analysis phase;
  an interlingual search phase between the source language and the target language;
the extracted sentence portions being the best overlaps between the result of the syntactic analysis of the source sentence whose elements have been replaced by possible translations and the results of the syntactic analysis of the target sentences stored in the database.

The second step of the method comprises, for example, a phase of determining the assemblies that form an overlap of the source sentence from the assemblies with greatest intersection, the selected overlaps being the sentence portions that have the greatest structural intersections that have a length greater than a given threshold.

When the overlap is total, a word not covered by the assemblies of greatest intersection is, for example, replaced by the corresponding source word with an indication signaling that this word is not translated.

In the third step, the assemblies selected are, for example, the assemblies that correspond to the overlaps that have the greatest number of words.

In the fourth step, the coherence criteria are, for example, a function of the inflections of the target language.

BRIEF DESCRIPTION OF THE DRAWINGS

Other features and benefits of the invention will become apparent from the following description, given in light of the appended drawings which represent.

MORE DETAILED DESCRIPTION

Figure 1:
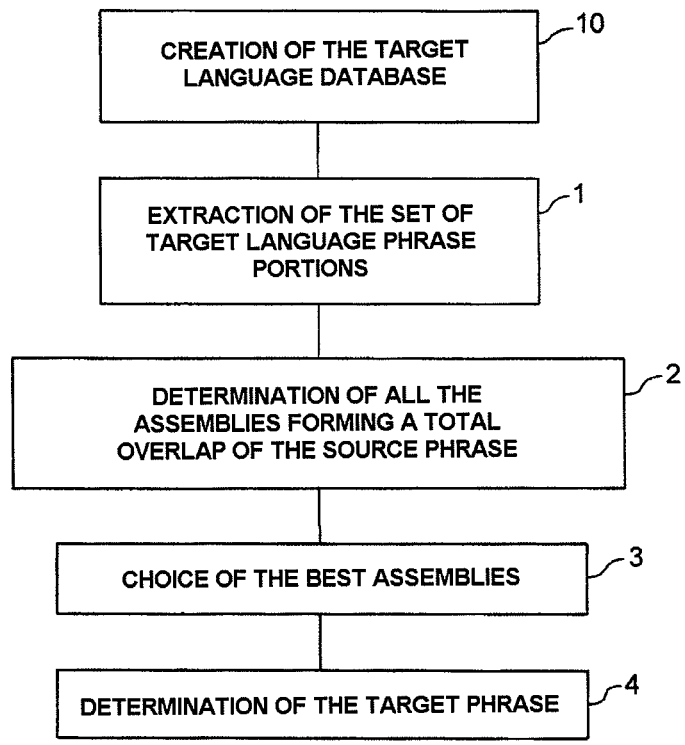
FIG. 1, a presentation of the possible steps for implementing the method according to the invention.

FIG. 1 illustrates the possible steps for implementing a method according to the invention. The method according to the invention notably combines linguistic technologies for deep syntactic analysis with learning on just the target language regarding the manner in which the translation is to be generated. To this end, the method relies notably on an indexing and interlingual textual search technology applied to the set of sentences of the target language that can notably be accessed in digital format over the network, the web, possibly complemented by textual documents, for a user for example. According to the invention, the translation poses the sentence to be translated as a request to this interlingual system and determines the set of sentences that give a structural and semantic intersection that is as complete as possible with a total overlap of the meaning of the source sentence to be translated. The sentences extracted in the target language are used to generate, by composition, the desired translation. The steps described hereinbelow implement this method.

In a preliminary step 10, the method creates, for example, the database of the target language, by using notably a morphosyntactic analyzer of the target language. In this database, a document typically corresponds to a sentence.

Hereinafter, for the translation of a source sentence to be translated, a first step 1 of the method executes the extraction of the set of sentence portions of the target language that correspond to a total or partial translation of the source sentence to be translated.

A second step 2 comprises the determination of all the assemblies of these target sentence portions that form a total overlap of the source sentence. Possibly, the overlap may be almost total in the case where proper nouns or unknown nouns are notably involved.

A third step 3 chooses the best assemblies according to a criterion of maximum overlap between the target sentence portions assembled in the step 2 and according to a criterion of minimizing the number of assembled elements. The overlaps are the common portions of the dependency charts, in other words, the words and their relationships, of each portion of the target sentences. The best overlaps according to the maximum overlap criterion correspond to those that have the greatest number of words.

A fourth step 4 determines the target sentence by choosing the best assembly that satisfies coherence criteria. These coherence criteria are notably the tenses of the verbs, the gender or the number, and more generally the inflection information. An inflection makes it possible to modify a word using this inflection information. Such inflection information expresses certain grammatical aspects and relationships such as declinations or conjugations for example.

Figure 2:
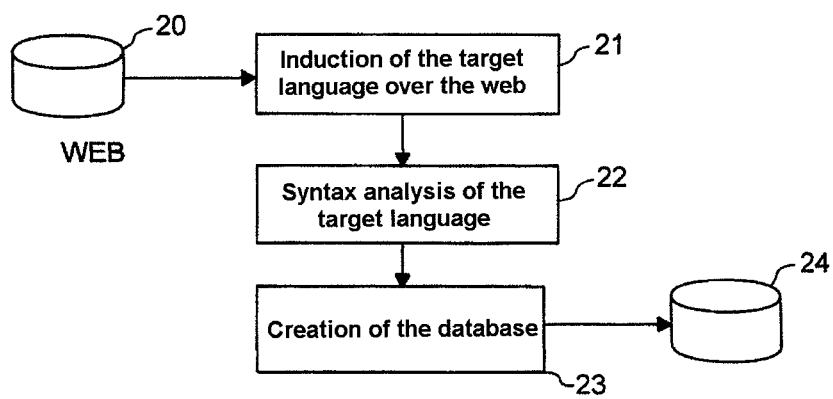
FIG. 2, an illustration of a textual database in a target language.

FIG. 2 illustrates an example of creation of the database in a possible preliminary step 10 of the method. This creation comprises a number of phases. In a first phase 21, the translation system recovers all the texts in the target language that can be accessed by the Internet or by any other means. The recovery of the texts over the Internet 20, or web, is, for example, carried out using a search robot or by the purchase of blocks from the web by an operator who browses entire websites to recover their possible content.

A second phase 22 breaks down the recovered texts into sentences according to known methods then performs a sequential syntactic analysis of these sentences, for example, in the form of dependency relationships, thus forming a deep structure giving a common representation to numerous forms that are superficially equivalent from the semantic point of view. A deep structure corresponds in practice to a syntactical representation in the form of dependency relationships. It is said to be deep because it can represent a number of so-called superficial formulations, that is to say, a succession of words that give the same meaning. A superficial form or structure corresponds to an arrangement of the words as it is in the text. There is notably equivalence of the qualifiers, adjectives or nouns. Thus, "cardiac" is associated with "of the heart". Similarly, there is equivalence between action nouns and verbs, for example "to read" is associated with "reading". Idiomatic words or expressions are standardized, that is to say that at least they are represented by their lemma or, better, by a representative of a set of lemmas adjudged to be completely synonymous. A lemma is a standardized form of a word as is found notably in a dictionary, notably corresponding to the nominative singular for nouns, to the masculine nominative singular for adjectives and to the infinitive for verbs. A calculation of the referent of the pronouns is carried out, making it possible to find the noun that the pronoun replaces. Information notations of the gender-number and tense-mode-person type are also carried out. The link between standardized deep structure and superficial forms is retained.

In a third phase 23, the textual database 24 is compiled. Each analyzed sentence becomes a document of a textual search system. The direct information, in a direct file, comprises the sentence in its target form and the syntactic analysis with the dependency links.

The direct file contains information regarding each of the indexed sentences, that is to say, the text of the sentence and a representation of the dependency syntactic analysis. This can be a list of triplets of words making up the syntactic analysis of the sentence with an indication for each triplet concerning the location of the words in the sentence.

The syntactic analysis is, for example, also coded in an inverted file in the form of governor-dependent-relationship triplets associated with an indication of location in the various sentences where they appear. This makes it possible, notably, to check whether triplets are combined to make more complex structures. This inverted file also includes simple words to be able also to search for them even if it is not possible to find relationships with the other words of the sentence. An inverted file is a file that associates a word or a triplet of words representing two words or two triplets, governor-dependent-relationship, in a dependency relationship with the list of its locations in the documents of the database 24. With regard to the governor-dependent-relationship triplet, in a dependency analysis the governor is the main word and the dependent, or governed word, is the word that qualifies it. For example, in the sentence "The cat drink hot milk", the word "drink" is the governor of the word "cat" with the agent relationship of the action and of the word "milk" with the direct object relationship. Moreover, the word "milk" is the governor of the word "hot" which is its dependent. The relationship information contained in a triplet notably indicates the nature of the relationship of the dependent word to the governed word, for example agent, complement, adverb, etc. . . . FIG. 2 illustrates an example of creation of a database in the target language. Other types of databases can be used. In particular, the data can be stored in a single file or a single database, or distributed in a number of places, the important thing being their accessibility.

Figure 3:
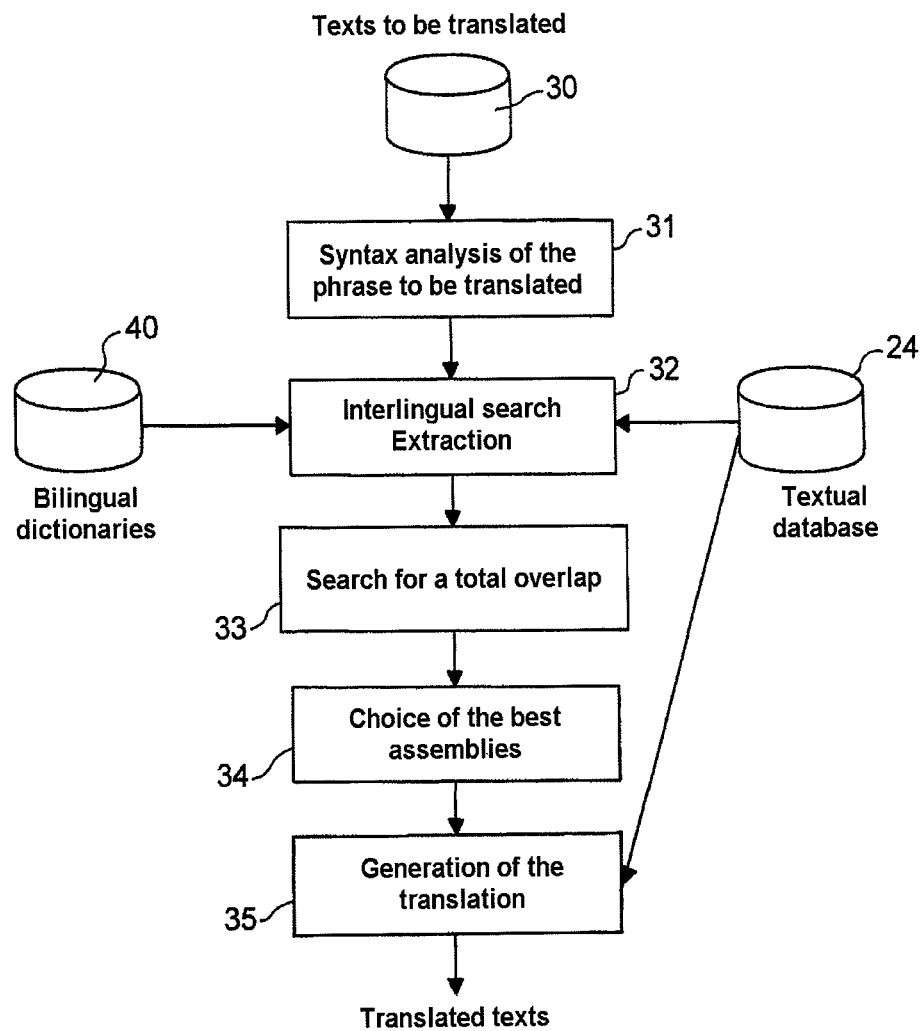
FIG. 3, an example of the sequencing of successive phases carrying out the steps of the method according to the invention.

FIG. 3 illustrates the other steps of the method according to the invention by an example of successions of phases. A sentence is extracted from a set 30 of texts to be translated. A first phase 31, performing a syntactic analysis of the sentence to be translated, and a second interlingual search phase 32, form the first step 1 of the method.

The first phase 31 therefore carries out the syntactic analysis of the sentence to be translated in the source language. This analysis is, for example, carried out by the same dependency syntactic analysis system as for the creation of the database in the target language 24, giving a dependency representation that is as deep as possible. The analysis of the target language and the analysis of the sentence to be translated into the source language are thus done with one and the same level of representation.

The second phase 32 uses an interlingual search system to find the best overlaps between the result of the syntactic analysis (31) of the source sentence whose elements have been replaced by possible translations and the results of the syntactic analysis (22) of the target sentences stored in the database (24). To carry out this interlingual search, a bilingual dictionary is used. In an additional phase, a generalized bilingual dictionary is advantageously compiled. This is because the bilingual dictionaries such as are found, for example, on the market can be inadequate to provide a good interlingual search, in particular in the case where no word-for-word translation of a portion of the sentence is possible. The fact that the overall translation of compound words or idiomatic expressions is taken into account, including when they are not contiguous, represents a significant improvement. This amounts to taking into account hyperwords that can be tagged by just one grammatical category. These hyperwords are therefore sub-portions of the sentence to be translated that are translated globally. Generally, a hyperword corresponds to sub-portions or sub-structures, not necessarily contiguous, that can be translated only globally. Thus, the hyperwords are dependents of the language pair involved, the source language and the target language. The more disparate the languages are in the way they establish the relationship between the words and the meaning, the more complex the structures to be correlated in the bilingual dictionary may become. This concerns simple words, such as, for example, "maison" in French and "house" in English, as well as compound words that are not translated word-for-word such as, for example, "seat belt" in English and "ceinture de sécurité" in French. This also concerns idiomatic expressions such as "avoir lieu" in French and "occur" in English or, for more disparate languages, more complex structures in which a verb governing a direct object complement is represented in the other language by a single verb.

In the interlingual search, partial translations contained in the bilingual dictionary 40 are used, by establishing the greatest structural intersections between the analysis of the source sentence 31 whose elements have been replaced by possible translations and the analyses of the target sentences stored in the textual database 24. The overlap between structures concerns only full words, apart from so-called empty words such as articles or prepositions for example. The empty words are attached without checking to their governor. To this end, it is, for example, possible to perform a triplet-by-triplet search (governor, dependent, relationship). The triplets that are strung together are attached to find the maximum intersection. This process has the notable advantage of making it possible to choose good translations for the ambiguous words that are also the most commonplace words and therefore words for which the database contains the maximum of contexts. Regarding the most specific words, these generally have just one translation.

The result of the interlingual search may be a list of sentence portions grouped together by the same structural intersections and arranged in descending order of structural intersection size. The sentence portions extracted in the extraction step 1 are, for example, the sentence portions in the list whose intersection length exceeds a given threshold.

In a following phase 33, the second step 2 of the method is complemented with a search for a total overlap of the structure of the source sentence based on the greatest intersections defined in the preceding phase. The aim is thus to construct a total overlap of the source structure from the greatest intersections. If this is not possible, a wider search is carried out in the list of interlingual search responses. Any remaining untranslated word is replaced by the corresponding source word with an indication making it possible to signal to a user that this word has not been translated.

The next phase 34 implements the step 3 for choosing the best assemblies.

Since the choice of the best assemblies is determined by a criterion of maximum overlap between the assembled target sentence portions and by a criteria of minimizing the number of assembled elements, the assemblies of superficial words that correspond to the overlaps that have the greatest number of words are, for example, selected for this purpose.

Following the preceding phases 31, 32, 33, 34, each piece of dependency structure found in the target sentences of the database 24 to correspond to a sub-structure of the source language has a relationship with the corresponding superficial structures. There are then available superficial word assemblies, forming superficial structures, and the order in which they are written to form the translation.

The final phase 35 implements the step 4 during which the target sentence retained from these best assemblies is the one that satisfies coherence criteria. These coherence criteria are notably the declinations or the conjugation endings, the tenses and the conjugation modes, as well as the counts, in particular the singular or plural marks. If necessary, a number of sentences can be retained for the translation of a source sentence.

Figure 4:
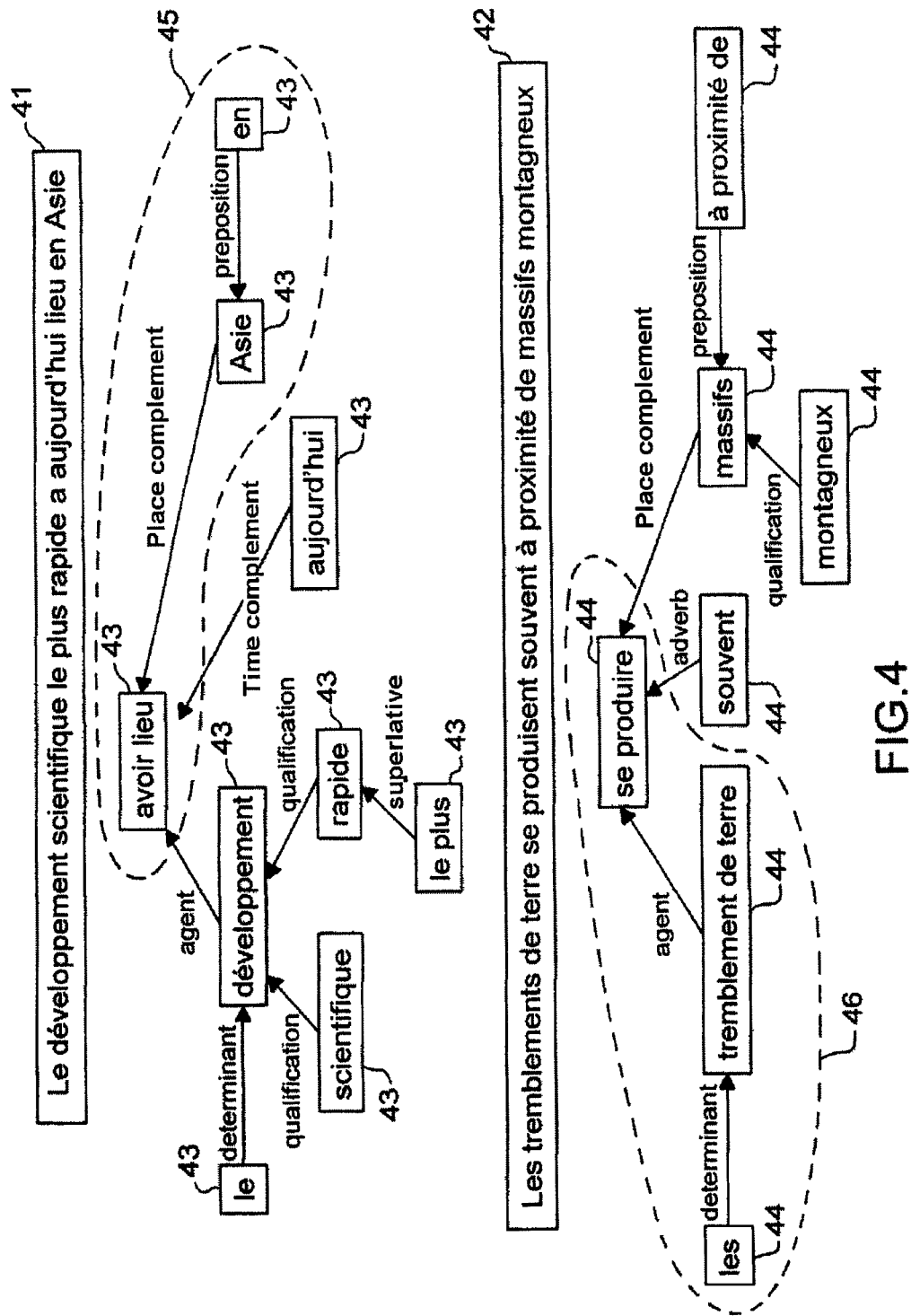
FIG. 4, an exemplary presentation of two sentences in French and their syntactic analyses, French being the target language of a translation.

The following figures illustrate an example of translation according to the invention according to the steps and the phases described previously. FIG. 4 shows two sentences 41, 42 extracted, for example, from the web in French which in this example is the target language. The first sentence 41 is "Le développement scientifique le plus rapide a aujourd'hui lieu en Asie" and the second sentence 42 is "Les tremblements de terre se produisent souvent à proximité de massifs montagneux". FIG. 4 also illustrates the syntactic analysis of these sentences. Each analysis is coded by triplets (governor, dependent, relationship). The relationships are illustrated by arrows linking the dependent words 42 to the governor words 42, and the nature of the relationship is also indicated. Thus, the word "scientifique" is the dependent of the word "développement" which is its governor, the relationship being a qualification relationship. The analysis uses words but also hyperwords such as "avoir lieu" for example. The word "Asie" is thus the dependent of the hyperword "avoir lieu" according to a dependency relationship that indicates a place complement. For these two examples, the database 24 stores the triplets as follows:

(développement, scientifique, qualification);
(avoir lieu, Asie, place complement).

The triplet data concerning the relationship indicates the nature of said relationship, qualification and place complement for these two examples.

For this first sentence 41, these two triplets are complemented by the following list of triplets:

(développement, le, determinant);
(avoir lieu, développement, agent);
(développement, rapide, qualification);
(rapide, le plus, superlative);
(avoir lieu, aujourd'hui, time complement);
(Asie, en, preposition).

For the second sentence 42, the list of triplets is as follows:
(se produire, souvent, adverb);
(se produire, tremblement de terre, agent);
(massif, montagneux, qualification);
(tremblement de terre, les, determinant);
(se produire, massif, place complement);
(massif, à proximité de, preposition).

These two French sentences 41, 42, taken by way of example, can be stored in a textual database 24 with their syntactic analyses represented by the above triplets.

The following description will show an example of the implementation of the method using the comparison mechanism that is used to determine the elements to be assembled to obtain the translation of a sentence.

Figure 5:
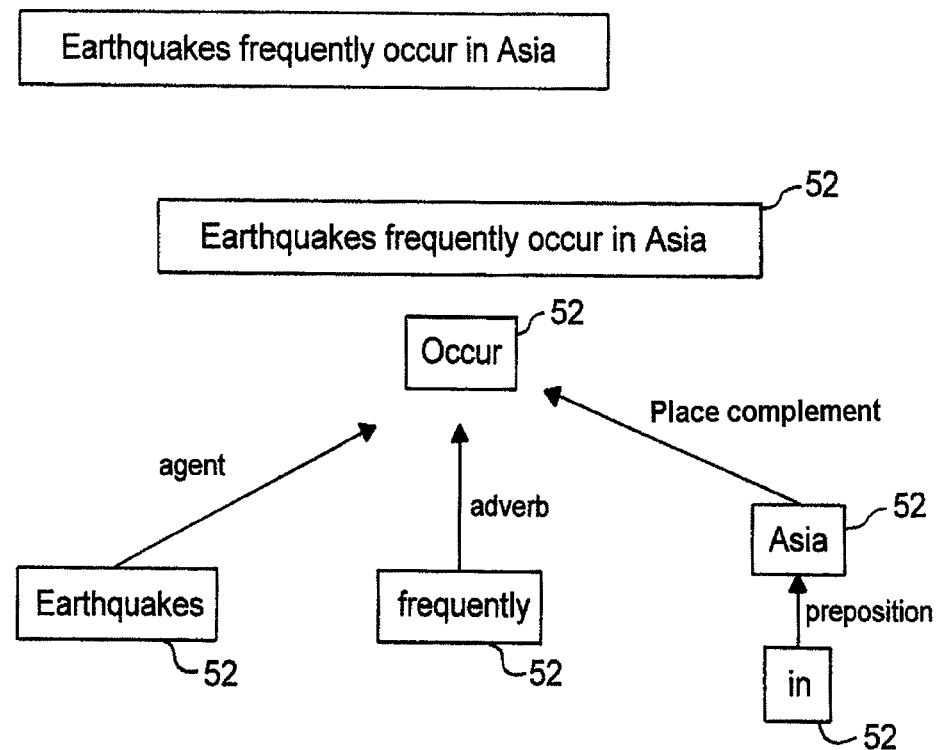
FIG. 5, a presentation of a sentence in English to be translated into French, and its syntactic analysis.

FIG. 5 shows by way of example a sentence 51 to be translated from English, the source language, to French, the target language. The sentence 51 is "Earthquakes frequently occur in Asia". The syntactic analysis carried out in the phase 31 of the first step 1 is illustrated in FIG. 5. The words 52, governors or dependents, are in a dependency relationship, the dependency relationships being illustrated by arrows going from a dependent word to the governor word. Thus, the syntactic analysis can be coded by the following list of triplets:

(occur, earthquake, agent);
(occur, frequently, adverb);
(occur, Asia, place complement);
(Asia, in, preposition).

Once the analysis is completed, the interlingual search is applied. The interlingual search system for example invokes its bilingual dictionary 40 to translate the words into the target language, as well as the expressions that are not translated word-for-word. Thus:

earthquake is translated as tremblement de terre;
occur is translated as arriver, intervenir, s'opérer, se dérouler, se produire, se présenter, se rencontrer, se trouver, survenir, avoir lieu;
frequently is translated as souvent, fréquemment.

The system searches for the English words by their French translations by searching for all the possible pairs, the pairs being defined by the dependency relationships established by the preceding syntactic analysis. Examples of pairs are given hereinbelow, the nature of the relationship between the words being indicated between parentheses:

tremblement de terre (agent), arrive;
tremblement de terre (agent), intervient;
tremblement de terre (agent), se produit;
tremblement de terre (agent), a lieu;
se produit (adverb), fréquemment;
se produit (adverb), souvent;
a lieu (adverb), souvent.

Only certain pairs are validated. More particularly, a maximum overlap is validated by linking the pairs. A first sentence portion 45 of the target language is "a lieu en Asie". A second sentence portion 46 is "les tremblements de terre se produisent".

Assemblies of sentence portions that form a total overlap of the source sentence are then produced. In this example, the portions 45 and 46 can be assembled to cover the source sentence, "se produire" and "avoir lieu" being judged to be synonymous for example by a monolingual reformulation dictionary in the target language, these portions being able to be joined to form a total overlap. Another problem to be overcome is the difference concerning the number, the conjugated verb of the first portion 45 being in the singular and the conjugated verb of the second portion 46 being in the plural. The transformation is simple using a French inflection. Thus, the second portion 46 gives the right agreement. Ultimately, an example of translation of the source sentence 51 is "les tremblements de terre se produisent souvent en Asie".

The invention claimed is:

1. A method of automatically translating a sentence in a source language, called a source sentence, into a sentence in a target language, called a target sentence, said method comprising:
a first step of extracting a set of sentence portions of the target language from a textual database that correspond to a total or partial translation of the source sentence to be translated;
a second step of determining all assemblies of the target sentence portions that overlap the source sentence;
a third step of choosing best assemblies according to a criterion of maximum overlap between the target sentence portions assembled in the second step and according to a criterion of minimizing a number of assembled elements; and
a fourth step of determining the target sentence by choosing a best assembly according to coherence criteria.

2. The method as claimed in claim 1, further comprising a preliminary step of creating the textual database of the target language from which the set of sentence portions are extracted.

3. The method as claimed in claim 2, wherein the database is created according to the following phases:
a first phase for recovering texts in the target language;
a second phase for breaking down the recovered texts into sentences and performing a syntactic analysis; and
a third phase for gathering together the texts of the sentences accompanied by a representation of their syntactic analysis.

4. The method as claimed in claim 3, wherein the syntactic analysis is carried out in a form of dependency relationships, a result of the syntactic analysis being coded by triplets (governor, dependent, relationship) associated with an indication of location in various sentences of the database in which the triplets appear, the governor being a main word and a dependent of the governor being a word that qualifies the governor according to the dependency relationship.

5. The method as claimed in claim 1, wherein the first step comprises:

a source sentence syntactic analysis phase; and an interlingual search phase between the source language and the target language, the extracted syntactic portions being best overlaps between a result of the syntactic analysis of the source sentence whose elements have been replaced by possible translations and results of the syntactic analysis of the target sentences stored in the database, the selected overlaps being sentence portions that have greatest structural intersections that have a length greater than a given threshold.

6. The method as claimed in claim 5, wherein the second step includes a phase of determining assemblies that form an overlap of the source sentence from assemblies with greatest intersection.

7. The method as claimed in claim 6, wherein when the overlap is total, a word not covered by the assemblies of greatest intersection is replaced by a corresponding source word with an indication signaling that the word not covered by the assemblies of greatest intersection is not translated.

8. The method as claimed in claim 1, wherein in the third step, the assemblies selected according to the maximum overlap criterion are those that correspond to overlaps that have a greatest number of words.

9. The method as claimed in claim 1, wherein in the fourth step, the coherence criteria are a function of inflections of the target language.

* * * * *